United States Patent [19]

Deveau

[11] 4,137,520
[45] Jan. 30, 1979

[54] TIRE PRESSURE INDICATOR SYSTEM

[76] Inventor: Levi J. Deveau, 2631 NW.-9-Terr., Wilton Manors, Tenn.

[21] Appl. No.: 905,205

[22] Filed: May 12, 1978

[51] Int. Cl.² .............................................. B60C 23/04
[52] U.S. Cl. ..................................... 340/58; 73/146.5; 340/539
[58] Field of Search ................. 73/146.5, 146.8, 146.4, 73/146.3, 146.2, 146; 340/58, 539; 200/61.22, 61.25

[56] References Cited

U.S. PATENT DOCUMENTS

| | | | |
|---|---|---|---|
| 2,727,221 | 12/1955 | Sprigg | 73/146.5 |
| 3,533,063 | 10/1970 | Garcia | 340/58 |
| 3,538,271 | 11/1970 | Mirsky | 340/58 |
| 3,568,145 | 3/1971 | Dikoff | 340/58 |
| 3,588,813 | 6/1971 | Robinson | 340/58 |
| 3,588,814 | 6/1971 | Furlong | 340/58 |
| 3,787,806 | 1/1974 | Church | 73/146.5 |
| 4,048,614 | 9/1977 | Shumway | 340/58 |

FOREIGN PATENT DOCUMENTS 472445 9/1937 United Kingdom ...................... 340/58

*Primary Examiner*—S. Clement Swisher
*Assistant Examiner*—Denis E. Corr
*Attorney, Agent, or Firm*—J. L. Jones, Sr.

[57] ABSTRACT

A tire pressure is measured by an electrical strain gage and a telemetering transmitter micro chip process and transmitter signal from a motor vehicle tire, indicating an abnormal tire pressure range. The above described tire pressure indicator includes a pressure tight bellows container which is preloaded to a selected gas pressure, and which contains the strain gage, telemetering signal transmitter and a battery power source. The tire pressure indicator is secured and disposed in the tire interior, mounted on the tire air pressure valve stem. A simple signal receiver warns of abnormal tire pressure, receiving the transmitted signal from any tire pressure indicator disposed in a single vehicle tire set.

2 Claims, 4 Drawing Figures

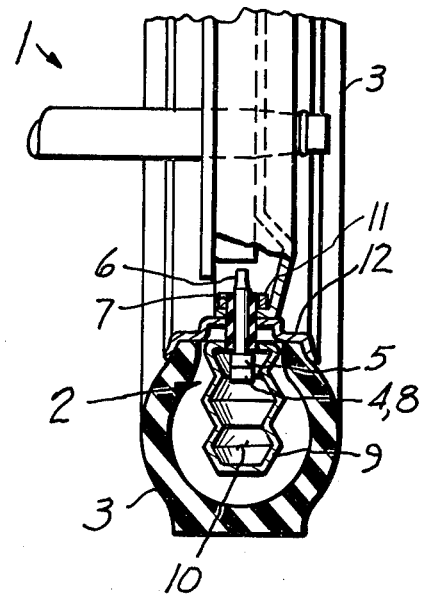
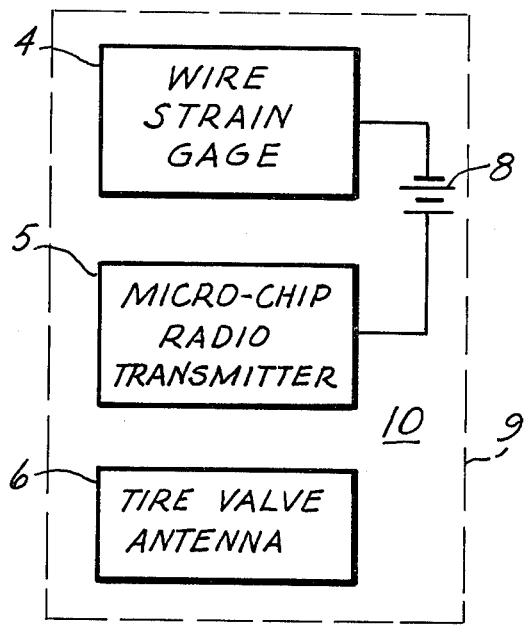
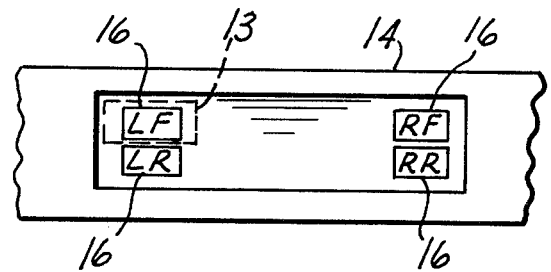
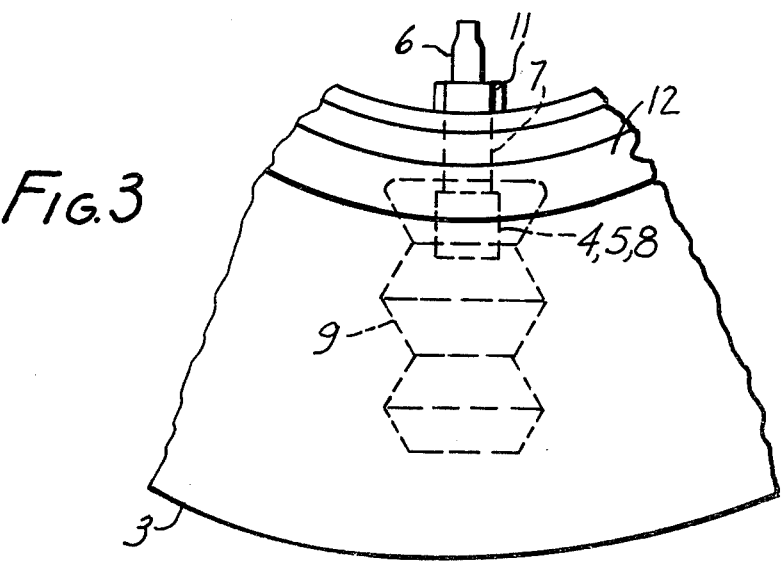

TIRE PRESSURE INDICATOR SYSTEM

BACKGROUND OF THE INVENTION

The tire pressure indicator of this invention is classified in Classes 340/58 and 200/61.25.

Robinson, in U.S. Pat. No. 3,588,813 issued June 28, 1971, discloses a tire pressure sensing device having a floating spring-biased piston moveable between axial positions corresponding to normal and abnormal tire pressures, and is mounted within the profile of a tire wheel rim. A flexible diaphragm having one side exposed to tire pressure and its opposite side engaging the piston, provides an electrical contact signaling abnormal tire pressure. Furlong, in U.S. Pat. No. 3,588,814 issued June 28, 1971, discloses means for converting tire rotational speed into signals whose values will be proportioned to tire speed of rotation and to the inflated condition of the tire. Dikoff et al disclosed in U.S. Pat. No. 3,568,145 issued Mar. 2, 1971, a sensor for tire pressure having one end of a conductor connected with a power source, with the second conductor end disposed to contact a tire rim on tire deflation. The sensor contact with the rim provides a signal. In U.S. Pat. No. 3,538,271 issued Nov. 3, 1970, Mirsky discloses a tire pressure indicator with mercury switches having vertically spaced contacts.

SUMMARY OF THE INVENTION

A vehicular tire pressure indicator system has at least one tire pressure indicator, each one of the indicators separately disposed in a separate vehicle tire. A simple light or audio signal indicator is disposed on the vehicle instrument panel. The panel indicator receives a telemetered signal from any one of the tire pressure indicators, the telemetered signal indicating abnormal tire pressure. The tire pressure indicator has an electrical strain gage coupled to a telemetering transmitter microchip which can process a signal from the strain gage and transmit the unbalanced strain gage signal to a signal receiver on the instrument panel. The indicator includes a battery power source. The whole of the indicator component includes an exterior pressure tight bellows container, pressurized to a selected gas pressure (nitrogen), and secured by a mount clamp to the air pressure filling valve stem on the interior of a tire mounted on a tire rim.

Included in the objects of this invention are:

To provide an indicator signaling an abnormal pressure in a vehicle tire.

To provide an individual tire pressure indicator, signalling a low pressure in a vehicle tire while the tire is rotating on a roadway on a vehicle.

Other objects and advantages of this invention are taught in the following description and claims.

BRIEF DESCRIPTION OF THE DRAWINGS

The description of this invention is to be read in conjunction with the following drawings;

FIG. 1 is a cross sectional view of a vehicle tire mounted on a wheel rim having a self-contained tire pressure indicator component disposed therein.

FIG. 2 is a block diagram of the tire pressure indicator system.

FIG. 3 is an elevational view of a vehicle instrument panel displaying a signal light which can be actuated by a telemetered signal from a tire pressure indicator component.

FIG. 4 is an elevational view of a vehicle tire having the tire pressure indicator secured internally to the tire pressure air stem.

DESCRIPTION OF THE PREFERRED EMBODIMENT OF THE INVENTION

As shown in FIG. 1, a vehicular tire pressure indicator system 1 has at least one tire pressure indicator 2, each one of 2 separately disposed and secured in a separate vehicular tire 3. As indicated in FIG. 2, the tire pressure indicator 2 has a diaphragm wire strain gage 4 electrically coupled to a conventional signal transmitter 5 microchip which can transmit a signal at a required frequency, utilizing as a coupled metal antenna 6 the metal stem of the rubber covered tire air pressure valve stem 7. A long life battery 8 provides a power source for the transmitter 5. The strain gage 4, the signal transmitter 5, the metal valve stem antenna 6, and the battery 8, electrically coupled together, are disposed inside of and secured in an external flexible bellows container 9, which in turn has an inert gas atmosphere 10 hermetically sealed in the container 9. The tire indicator 2 comprises gage 4, transmitter 5, metal valve stem antenna 6, battery 8, container 9, together with a nut mounting clamp means 11 securing and disposing the bellows container 9 inside a tire 2 and tire rim 12, and nut clamp 11, also coupling said transmitter 5 to the valve stem antenna 6, providing an operative tire pressure indicator 2.

On loss of tire pressure in tire 2, or on excessive increase in tire pressure, the flexible bellows container 9, in which is hermetically sealed atmosphere 10 expands or contracts in volume. The change in pressure of atmosphere 10 activates the strain gage 4, when the pressure exceeds preset limit values. The strain gage 4 signals the transmitter 5, which in turn transmits a signal to an indicating conventional receiver 13 disposed in the instrument panel 14. Only one receiver 13 is required for a plurality of indicators 2. By coding signals from a set of four or more indicators 2 for each tire, four or more pressure indicators 2 can be separately monitored. Indicating lights 16, or audible signals can be activated on the instrument panel 14, powered by the vehicle battery power 15.

The tire pressure system 1 comprises the tire pressure indicator 2, together with the signal receiver 13.

Many modifications in the tire pressure indicator system can be made in the light of my teachings. It is understood that within the scope of the claims, the invention can be practiced otherwise than as described.

I claim:

1. A vehicular tire pressure indicator system, in combination comprising:
   at least one tire pressure indicator having
      a diaphragm wire strain gage adapted to signal on departure of said diaphragm from a specified pressure range value,
      a signal transmitter disposed on a microchip, said transmitter adaptively coupled to receive an unbalanced pressure electrical signal from said strain gage, and to transmit said pressure signal to a tire stem metal antenna,
      a battery power source electrically powering said indicator,
      a flexible bellows hermetically enclosing said strain gage, signal transmitter, and said power source, said flexible bellows having an inert gas atmosphere disposed therein at a specific pressure value, a metal valve stem for a tire, having an electrical insulation exterior, providing a signal transmitter antenna, a mounting clamp means having an electrical conductive coupling between said transmitter and said antenna, said clamp securing said flexible bellows in the interior of said tire disposed on said tire stem, at least one signal receiver having signal indicating means secured thereon, providing information that said tire pressure indicator signals a tire pressure value exceeding a predetermined value.

2. In the combination set forth in claim 1, the further modification wherein a said signal indicating means is disposed in a vehicle and has a specific designated coded signal receiver and can receive a coded signal from a specifically designated tire.